United States Patent
Li et al.

(10) Patent No.: US 11,436,834 B2
(45) Date of Patent: *Sep. 6, 2022

(54) DETECTION OF DEMARCATING SEGMENTS IN VIDEO

(71) Applicant: ARRIS Enterprises LLC, Suwanee, GA (US)

(72) Inventors: Renxiang Li, Lake Zurich, IL (US); Faisal Ishtiaq, Plainfield, IL (US); Stephen P. Emeott, Cedar Park, TX (US); Anthony J. Braskich, Kildeer, IL (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/336,125

(22) Filed: Jun. 1, 2021

(65) Prior Publication Data

US 2021/0287012 A1 Sep. 16, 2021

Related U.S. Application Data

(63) Continuation of application No. 14/302,229, filed on Jun. 11, 2014, now Pat. No. 11,023,737.

(51) Int. Cl.
| | |
|---|---|
| *G06K 9/00* | (2022.01) |
| *G06K 9/62* | (2022.01) |
| *G11B 27/28* | (2006.01) |
| *H04N 5/91* | (2006.01) |
| *G06V 20/40* | (2022.01) |

(52) U.S. Cl.
CPC ........... *G06V 20/49* (2022.01); *G06K 9/6218* (2013.01); *G06V 20/46* (2022.01); *G06V 20/47* (2022.01);

(Continued)

(58) Field of Classification Search
CPC .......... G06K 9/00765; G06K 9/00744; G06K 9/00751; G06K 9/6218; G06K 2009/00738; G11B 27/28; H04N 5/91
See application file for complete search history.

(56) References Cited

U.S. PATENT DOCUMENTS

| | | |
|---|---|---|
| 8,259,806 B2 | 9/2012 | Radhakrishnan et al. |
| 8,515,253 B2 | 8/2013 | Cottrell |

(Continued)

OTHER PUBLICATIONS

Official Action, RE: Canadian Application No. 2,951,852, dated Nov. 20, 2017.

(Continued)

*Primary Examiner* — Alazar Tilahun
(74) *Attorney, Agent, or Firm* — Chernoff, Vilhauer, McClung & Stenzel, LLP

(57) ABSTRACT

A method of detecting frames in a video that demarcate a pre-determined type of video segment within the video is provided. The method includes identifying visually distinctive candidate marker frames within the video, grouping the candidate marker frames into a plurality of groups based on visual similarity, computing a collective score for each of the groups based on temporal proximity of each of the candidate marker frames within the group to related events occurring within the video, and selecting at least one of the groups based on the collective proximity scores as marker frames that demarcate the pre-determined type of video segment. A video processing electronic device and at least one non-transitory computer readable storage medium having computer program instructions stored thereon for performing the method are also provided.

18 Claims, 12 Drawing Sheets

(52) U.S. Cl.
CPC ............... *G11B 27/28* (2013.01); *H04N 5/91* (2013.01); *G06V 20/44* (2022.01)

(56) References Cited

U.S. PATENT DOCUMENTS

| | | | |
|---|---|---|---|
| 8,913,872 | B1 | 12/2014 | Goz et al. |
| 2003/0063798 | A1* | 4/2003 | Li ..................... G06K 9/00711 382/165 |
| 2005/0257151 | A1* | 11/2005 | Wu ........................ G11B 27/28 715/716 |
| 2008/0123733 | A1 | 5/2008 | Yu et al. |
| 2008/0159383 | A1 | 7/2008 | Kukreja et al. |
| 2009/0116811 | A1 | 5/2009 | Kukreja et al. |
| 2010/0124378 | A1 | 5/2010 | Das et al. |
| 2012/0114167 | A1 | 5/2012 | Tian et al. |
| 2012/0210228 | A1* | 8/2012 | Wang ................... G11B 27/034 715/723 |
| 2014/0028917 | A1 | 1/2014 | Smith et al. |

OTHER PUBLICATIONS

Examination Report, RE: Great Britain Application No. GB1621061.9, dated Feb. 1, 2017.
F. Dufaux, Key frame selection to represent a video, Image Processing, 2000, pp. 275-278.
Y. Gao, et al., "Thematic Video Thumbnail Selection", Image Processing, 2009, pp. 4333-4336.
J.L. Lai, et al., "Key frame extraction based on visual attention model", Journal of Visual Communication and Image Representation, 2012, pp. 114-125.
PCT Search Report & Written Opinion, RE: Application No. PCT/US2015/033722, dated Sep. 14, 2015.
X. Zhu, et al., "Exploring Video Content Structure for Hierarchical Summarization," Multimedia Systems, ACM, vol. 10, No. 2, Nov. 1, 2004, pp. 98-115.
M.M. Yeung, et al., "Efficient matching and clustering of video shots," Proceedings of the International Conference on Image Processing (ICIP), vol. 1, Oct. 23, 1995, pp. 338-341.

* cited by examiner

DETECTION OF DEMARCATING SEGMENTS IN VIDEO

CROSS-REFERENCE TO RELATED APPLICATIONS

This application is a continuation of U.S. patent application Ser. No. 14/302,229 filed Jun. 11, 2014, the contents of which are incorporated herein by reference.

BACKGROUND

Broadband network operators, such as multiple system operators (MSOs), distribute and deliver services such as video, audio, and multimedia content to subscribers or end-users. For example, a broadband cable network MSO may utilize resources for transmitting digital video as linear (i.e., scheduled) services or as non-linear services enabling viewers to retrieve audiovisual contents at any time independent from linear (i.e., scheduled) broadcast services. Non-linear services may be time-displaced, for instance, by only a few minutes or by many months from its corresponding linear broadcast service or may be repeat consumption of a program.

Highlight or replay viewing of content provides a specific example of non-linear viewing. For instance, a viewer that may not have sufficient free time to watch a three hour sports contest, such as a football game, from beginning to end may instead view the game at a later time on any number of different types of electronic viewing devices. For instance, viewing may be accomplished with a portable device with an objective of only watching plays of a specific team, plays involving a specific player, or exciting moments occurring within a game.

Professionally produced sports video typically includes the use of replay clips or video segments which necessarily correlate with exciting moments or highlights occurring within a game. The ability to view such highlights and/or replays as a non-linear service may be particularly desirable for users that are only able to start watching a game after its start so that the viewer may quickly catch up on what has occurred in the game or such viewing may enable a viewer to quickly ascertain the essence of a completed game.

BRIEF DESCRIPTION OF THE DRAWINGS

Various features of the embodiments described in the following detailed description can be more fully appreciated when considered with reference to the accompanying figures, wherein the same numbers refer to the same elements.

DETAILED DESCRIPTION

Figure 1:
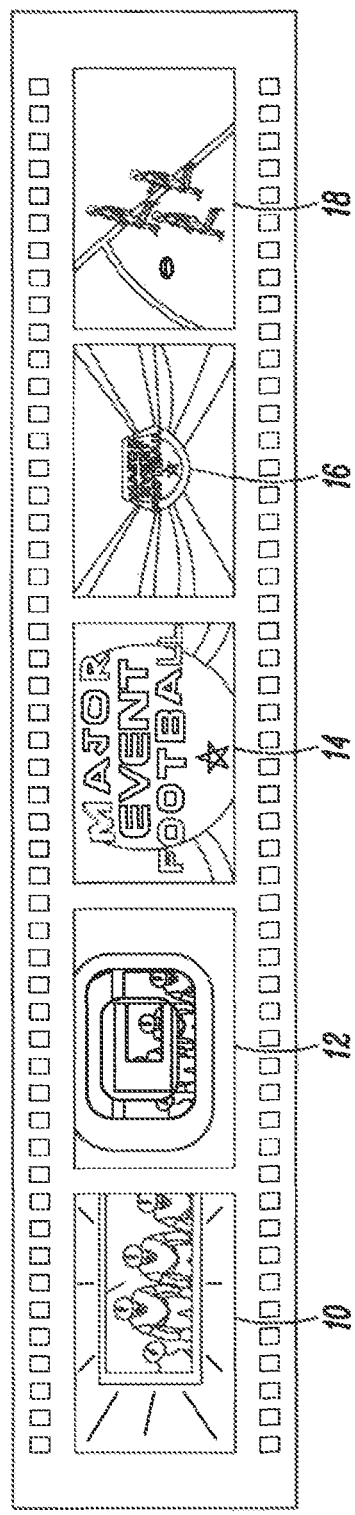
FIG. 1 is a simplified diagram providing examples of different marker frames within a video in accordance with an embodiment.

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures have not been described in detail so as not to unnecessarily obscure the embodiments.

According to an embodiment, a method and apparatus are provided enabling a highlight or replay service to be offered by a provider over a network to subscribers as a non-linear service. The service enables automatic, high quality, replay extraction from video and playback of the extracted replays to subscribers. Such a service may automatically extract and generate a sequence of highlight/replay clips within a given broadcast program, such as a football game, other sports contest, or the like. For this purpose, the method and apparatus should be able to readily identify highlight and replay clips or other clips of desire from video sequences to enable ready location and/or extraction thereof.

With respect to a video of a football game or the like, highlights and replays may be detectable to some extent by heuristics, such as locations in video where the use of telestration, slow motion, or the absence of a score panel may be detected. However, these readily detectable events are by nature non-exclusive and unreliable and may generate many false detections or may be unable to detect some highlights or replays that do not contain such events.

According to an embodiment, highlight and replay clips are located within video based on the use, for instance, in professional broadcast sports video, of visual cues to signal the start and/or end of highlights and replays. Thus, highlight or replay sequences or clips within a video are demarcated by a sequence of visually distinctive video frames. For purposes of this disclosure, these sequences of visually distinctive frames are referred to as "marker frames" or "markers". The sequence of marker frames is also referred to as a demarcating segment. A video may contain multiple demarcating segments each serving a different purpose, for instance, one to signal the start of a replay clip and another to signal the end of a replay clip.

According to an embodiment, a method and apparatus are provided that are able to automatically identify, verify, and apply marker frames within a video for purposes of automatically generating a highlight/replay clip service.

Different video programs, types of programs, producers of programs, etc. necessarily use different demarcating segments or visual cues. Moreover, demarcating segments used by a particular video producer may change from one game to the next, from one part of the season to the next, and from one season to the next. Thus, the method is required to identify demarcating segments in each video and not rely on known demarcating segments previously identified in other videos. After the demarcating segments are identified within a given video, highlights and replays from the given video can be reliably detected by matching the signatures of the marker frames to the signatures of the video frames and determining their location within the video stream.

A demarcating segment typically involves the use of statically and dynamically visually distinct video frames because demarcating segments must provide sufficiently strong visual stimuli to indicate the start or end of a replay clip or like segment of interest and demarcating segments must not be confused with other visual content, such as content from other genre and advertisements.

Figure 2:
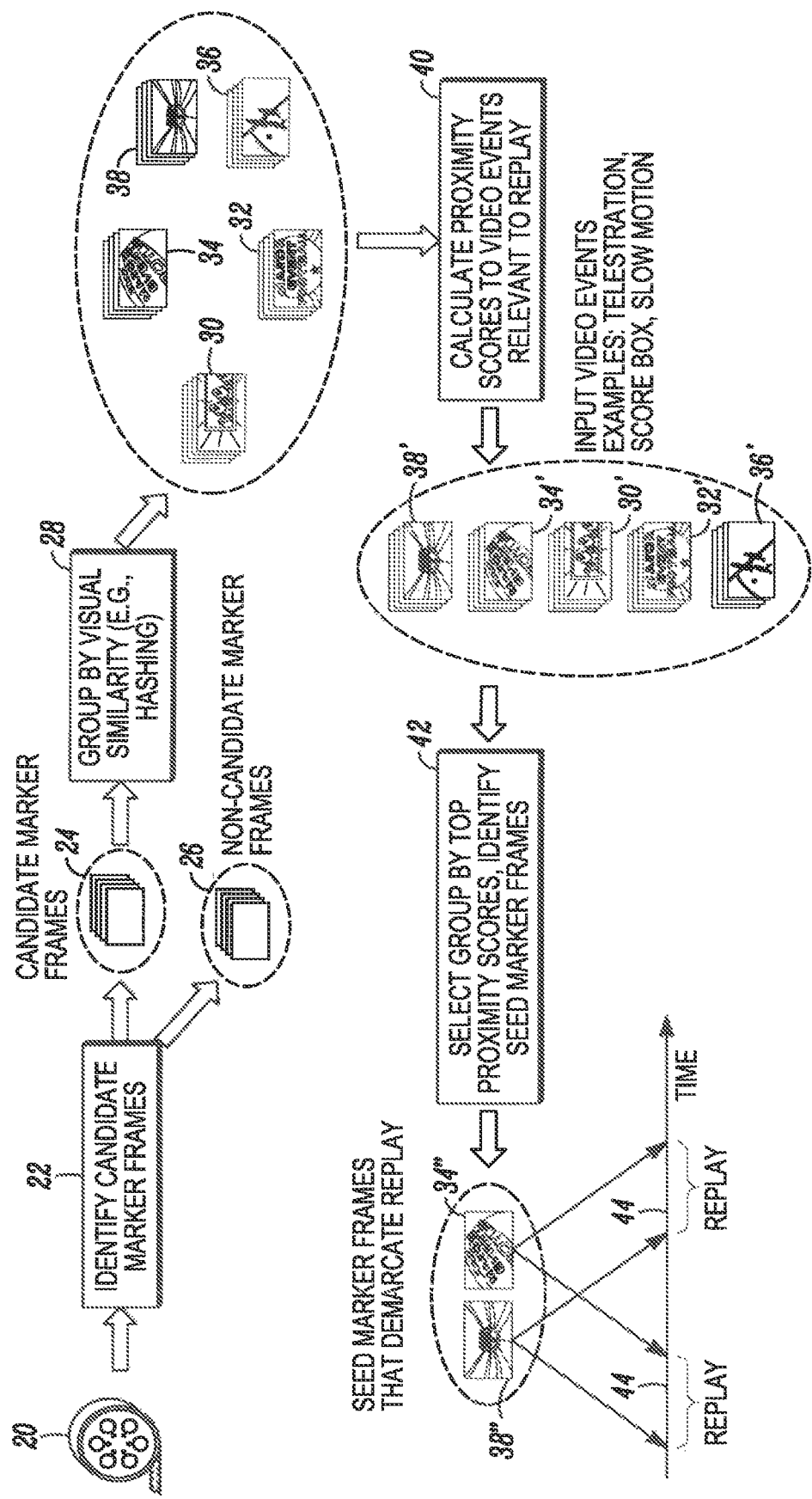
FIG. 2 is a diagram representing a process for detecting marker frames within a video in accordance with an embodiment.

According to an embodiment and based on the above information, video frames from the video that are visually distinct are automatically detected. As an example of video frames, FIG. 1 provides five video frames 10, 12, 14, 16, and 18 that each may be determined to be visually distinct from most other more common images within the frames of the video. However, only one of these frames 10, 12, 14, 16, and 18 may actually be used in the video to demarcate the beginning of a replay segment. The visually distinct frames are referred to herein as "candidate marker frames" and represent a subset of video frames of the video from which the true replay marker frame or frames are ultimately determined. Thus, as shown in FIG. 2, a video 20 is subject to a step 22 of identifying candidate marker frames and may sort some or all frames of the video 20 into a subset 24 of candidate marker frames and a subset 26 of non-candidate marker frames.

For purposes of obtaining the candidate marker frames 24, selected visual features may be extracted and obtained from each frame of the video. An example of a visual feature may be, for instance, a set of Color Layout Descriptors (CLDs) which capture spatial distribution of color in an image or frame of video. Another example of visual features is the Edge Histogram Descriptor (EHD). Yet another example of visual feature is the color histograms of color image. Different visual features for a video frame can be combined into an augmented visual feature. For example, combining CLD and EHD coefficients would formulate a 92 dimension vector, where 12 coefficients come from CLD and 80 coefficients come from EHD. Based on the features from a frame unit (such as one or more consecutive frames), a statistical model for the video is generated. A probability vector for a frame unit is obtained by plugging the features from a frame unit into the statistical model. The probability vector may be used to automatically separate and identify visually distinct frames or candidate marker frames from remaining video frames.

After the candidate marker frames 24 are extracted from the video, the candidate marker frames 24 are grouped based on visual similarity into a plurality of different groups. In one embodiment, the candidate marker frames are grouped based on a subset of CLD coefficients, i.e., if the subsets of coefficient values for two video frames are identical, then the two frames fall into the same group. One way to implement this grouping is to create a hashing key by concatenating the selected subset of feature values into an integer. Other clustering methods, such as K-means or hierarchical clustering, can be used for the purpose of grouping. In another embodiment, the K-means clustering is used to group the candidate marker frames. See step 28 in FIG. 2 which results in the formation of five separate groups 30, 32, 34, 36 and 38 of candidate marker frames for the example shown in FIG. 2. By way of example, if identical or highly similar candidate marker frames appear numerous times throughout a video, these candidate marker frames are likely located in the same group. Thus, at least some of the groups may consist of visually identical or similar but temporally scattered frames, because these frames belong to the demarcating segments which appear multiple times in the video, whenever there is a replay clip. From these groups, the true replay marker frames are ultimately identified.

For purposes of identifying true replay marker frames from the groups of candidate marker frames, an embodiment provides each group with a proximity score. See step 40 in FIG. 2 applied to each of the groups 30, 32, 34, 36 and 38 of candidate marker frames. The proximity score relates to temporal closeness of the candidate marker frames to so-called "input video events" that may possibly be contained in at least some of the replay clips in a video, but not necessarily every replay clip in the video. For instance, there may be many readily detectable events occurring within video for use in detecting a replay clip, such as the presence or absence of a score panel in video frames, the presence of telestration in video frames, or the use of slow motion in video frames.

Typically the so called "input video event" exists over a time period starting from the left boundary T_left to the right boundary T_right. In one embodiment, in order to calculate the proximity score, a proximity function is defined for the left and right boundary respectively, over the left window [T_left-K, T_left] and right [T_right, T_right+K], where K is the length of the window. The function value can be proportional to the proximity to the input video event, hence ascending at the left window and descending as the right window. Alternatively, the function can be flat at either or both of the windows. The flat function essentially defines a binary proximity score. In another embodiment, a single frame is selected within the time period of the given input video event; in this case T_left=T_right.

Usually different marker frames are used to demarcate the start and end of a highlight/replay. However, sometimes the same sequence of marker frames is used to demarcate both the start and the end of highlight/replay. In general, each group of the candidate marker frames is subject to the test of proximity score for both start and end. Hence, if a group of marker frames demarcates both start and end of highlight/replay, it will receive high proximity score for both start and end.

A score panel that may be shown during a sporting event, such as a football game, may disappear during replay. However, score panels may also be absent at the beginning of a game, during advertisements, or during other segments of a game. Telestration may appear in some replay segments, but not all replay segments. Slow motion may appear in some replay segments, but not all replay segments. Although detecting replay segments solely based on absence of score panel, detection of telestration, or detection of slow motion events may be inherently unreliable or inconclusive, these events can be useful in step 40 for identifying which group of the visually distinct candidate marker frames are the true marker frames of replay segments based on the development of a proximity score. The closer a candidate marker frame is temporally to one of the above replay events (score panel absence, telestration, slow motion, etc.) the higher the proximity score. Collectively, the group of candidate marker frames that contains the true replay marker frames will produce a higher average proximity score, because these frames collectively will be statistically closer, in time, to the given replay events.

Accordingly, after the proximity score is determined for each group 30', 32', 34', 36' and 38' of candidate marker frames in FIG. 2, the true marker frames are selected in step 42 as the group having the proximity score indicating the group that is collectively closer to the events. Thus, the true, or "seed", marker frames are identified. As shown in the left hand bottom corner of FIG. 2, group 38" of candidate marker frames is selected as demarcating the beginning of each replay 44 and group 34" of candidate marker frames is selected as demarcating the end of each replay 44 occurring in the video 20. With this information produced automatically, a video sequence consisting of only replay clips extracted from video 20 can be readily generated and made available to subscribers for video applications, such as non-linear consumption.

Thus, as shown in FIG. 2, a method may include the steps of identifying 22 candidate marker frames 24 within a video 20, grouping 28 the candidate marker frames 24 based on visual similarity, computing 40 a score for each group based on the collective temporal proximity of its constituent frames to pre-detected events within the video, and selecting 42 the frames in one or more groups, based on the group's score, as marker frames of the start and/or end of replay clips. Based on the selected marker frames, the video 20 may be searched, the marker frames may be matched to frames in the video 20 demarcating replay segments 44, and the demarcated replay segments 44 within the video may be extracted and used to create a highlight/replay video sequence. Alternatively, the final product may be a list of possible video segments per the selected criteria (i.e., sports replays, in the above example). Creating a highlight/replay video sequence may comprise creating a new video sequence that is constructed from the concatenation of the several demarcated replay segments 44. The demarcated replay segments may be concatenated in the order in which they appear in the video 20, or may be reordered by some other means. In another embodiment, the highlight/replay video sequence may include portions of the video 20 that occur adjacent to the replay segments 44. For example, the highlight/replay video sequence may include a portion of the video 20 that occurs immediately before each demarcated replay segment 44.

A list of possible video segments may be used to create a video playback application for a user. In one embodiment, the user may be presented with a sequence of the demarcated replay segments 44. Each segment may be represented, for example, using a text description, time information, or one or more images. The user may then select the demarcated replay segment 44 to play the segment. The user may select and watch one segment at a time, or, for example, may choose several segments and watch all selected segments in a sequence.

Figure 3:
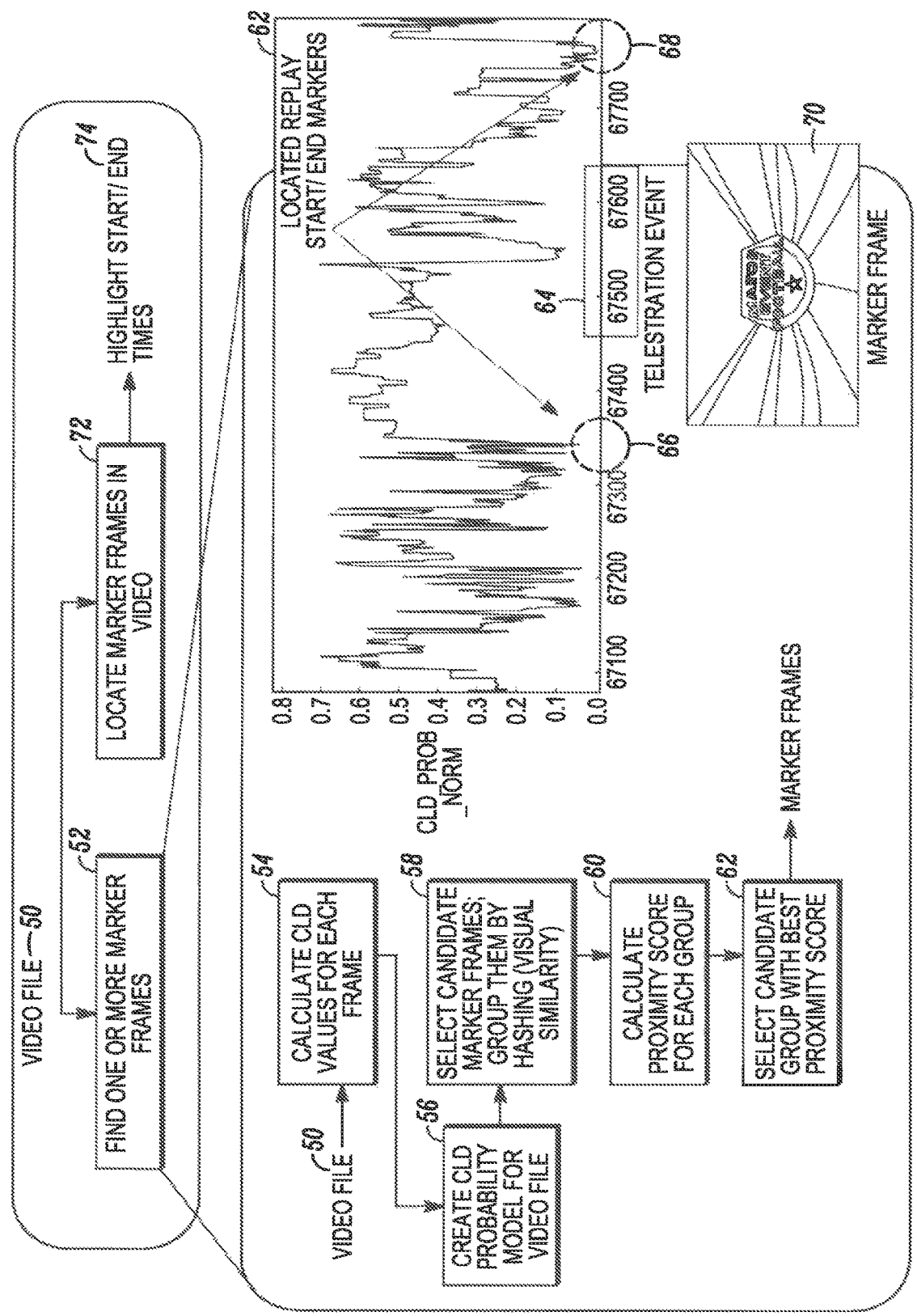
FIG. 3 is a diagram representing a process for detecting marker frames within a video in accordance with an embodiment.

FIG. 3 provides further details of a method according to an embodiment. A video file 50 is subject to a process 52 of determining one or more replay marker frames. For this purpose, each frame of the video file 50 is transformed into a set of features, and the sets of features generated from one or more frames are used to generate a statistical model or probability distribution of the set of features. For instance, in step 54, twelve coefficients of a Color Layout Descriptor (CLD) may be calculated for each frame. See FIG. 4A and FIG. 4B as an example. Another example is to concatenate CLDs from five consecutive video frames (thereby generating sixty histograms for each set of five consecutive frames). In step 56, a CLD probability model is created for the video file 50 based on the CLD values calculated in step 54. See FIG. 6 as an example. The video frames are then classified in step 58 into candidate marker frames and non-candidate marker frames using the CLD values calculated in step 54 and the probability distribution created in step 56, and the candidate marker frames are grouped into one or more groups based on visual similarity, for instance, by hashing.

As is well known in the art, hashing is a data storage method utilizing a key-value store. For each value to be stored, a hash function takes the value to be stored as input and outputs a corresponding hash key. Subsequently, the value is then stored in the key-value store using the computed hash key. If multiple values correspond to the same hash key, then the multiple values are stored in a collection or list affiliated with the hash key. Grouping candidate marker frames into one or more groups based on visual similarity may be accomplished by the choice of the hash function. In one embodiment, the hash function takes as input the CLD values and outputs an integer hash key. For example, if a first CLD and a second CLD represent visually similar frames, then a hash function may output the same integer hash key for both CLDs. As a result, storing the CLDs in a key-value store will result in the two visually similar CLDs being stored together in the same collection or list.

In one embodiment, the hash function may be computed by concatenating (bitwise operation) a selected subset of visual features into an integer, which is used as the hash key.

In step 60 of FIG. 3, event information from other detectors (i.e., for telestration, score panel presence or absence, slow motion, etc.) is used to calculate proximity scores for each group. For instance, see the graph 62 of probability distribution provided in FIG. 3 in which a telestration event 64 occurring in the video is detected and proximity of marker frames 66 and 68 can be determined. The closer in time a candidate marker frame is to a detected video event, the higher the proximity score for the frame. Although proximity is determined to a detected highlight event that may not occur in every replay clip, collectively the true group of candidate marker frames will receive a higher proximity score than other groups and will stand out for being selected as the true seed replay marker despite there being missing or false highlight detections.

In another embodiment, in step 60 of FIG. 3, the relationships between candidate marker frames in at least one or more groups of candidate marker frames are used to calculate proximity scores for pairs of related events. Candidate marker frames typically occur in pairs, wherein each pair consists of a start marker frame and an end marker frame. The minimum and maximum distance between the first and second marker frames is determined by the expected minimum and maximum lengths of a replay event, which in one embodiment might be between 10 and 240 seconds in duration. The proximity score for each group of candidate marker frames may be calculated by pairing each candidate marker frames, representing a frame from a group of start marker frames, with the marker frames from a second group of candidate marker frames, each representing a group of end marker frames. The operation of pairing consists of matching each candidate marker frame with a related candidate maker frame from the second group. A match occurs when the candidate marker frame from the second group occurs within the expected minimum and maximum distance from the candidate marker frame of the first group. A candidate marker frame with a match outside the expected minimum and maximum length of a replay event can be excluded from the proximity score for related events. Overlapping events may also be excluded. The proximity score for a group is the best pairing between the candidate marker frames and the candidate marker frames of a second group. In a group consisting of start or end marker frames, the values of the Color Layout Descriptor of the candidate marker frames in a group will have a small range of values. Therefore, the variance of the Color Layout Descriptors for the candidate marker frames in a first group paired with the candidate marker frames in a second group could be used to validate that the first group contains a set of start frames instead of a random collection of similar but unrelated frames.

In step 62 of FIG. 3, at least one group is identified based on having the best proximity score as seed marker frames for demarcating replay segments. See marker frame 70 in FIG. 3. The demarcating segments in the video file 50 can be identified and verified by searching and matching neighbor frames surrounding the seed marker frame 70 located at different time instances in the video file 50. As an alternative, the seed marker frame 70 may be used as a one-frame demarcating segment. With the seed marker frame 70 identified as a result of performing process 52, a step 72 of locating the identified demarcating segments within the video file 50 can then be accomplished for purposes of determining the start and end times 74 of highlights or replays within the video file 50.

FIGS. 4-8 represent results of applying the method discussed above and according to FIGS. 9 and 10 to a test video of an actual televised broadcast of a football game. The test video has a playing time of three hours and is comprised of 323,678 separate video frames. All of the original frames, including advertisements shown during the televised broadcast, were included in the testing. Each replay video segment in the test video is sandwiched by two different demarcating segments, one demarcating the start of the replay clip and one demarcating the end of the replay clip. Each demarcating segment includes a number of marker frames. For purposes of this example, a single marker frame is selected from each of the demarcating segments and is used for identifying replay clips and determining proximity scores from telestration input events.

In the test video, twenty-six separate telestration input events were detected and thereby indicate that there is at least twenty-six separate points in the test video where a replay clip may be provided. With use of the method described above and in FIGS. 9 and 10, two marker frames are identified, one for the beginning of the replay and the other for the end. In total, seventy-six replay clips were identified by searching the three hour playing time of the test video for the identified seed marker frames. If telestration events by themselves are used to locate replay clips in the test video, only twenty-six replay clips would be identified. However, by using the method disclosed above in which telestration events are used only for purposes of producing proximately scores for groups of candidate marker frames (i.e., visually distinctive frames), seventy-six replay clips were able to be accurately identified in the test video.

Figure 4A:
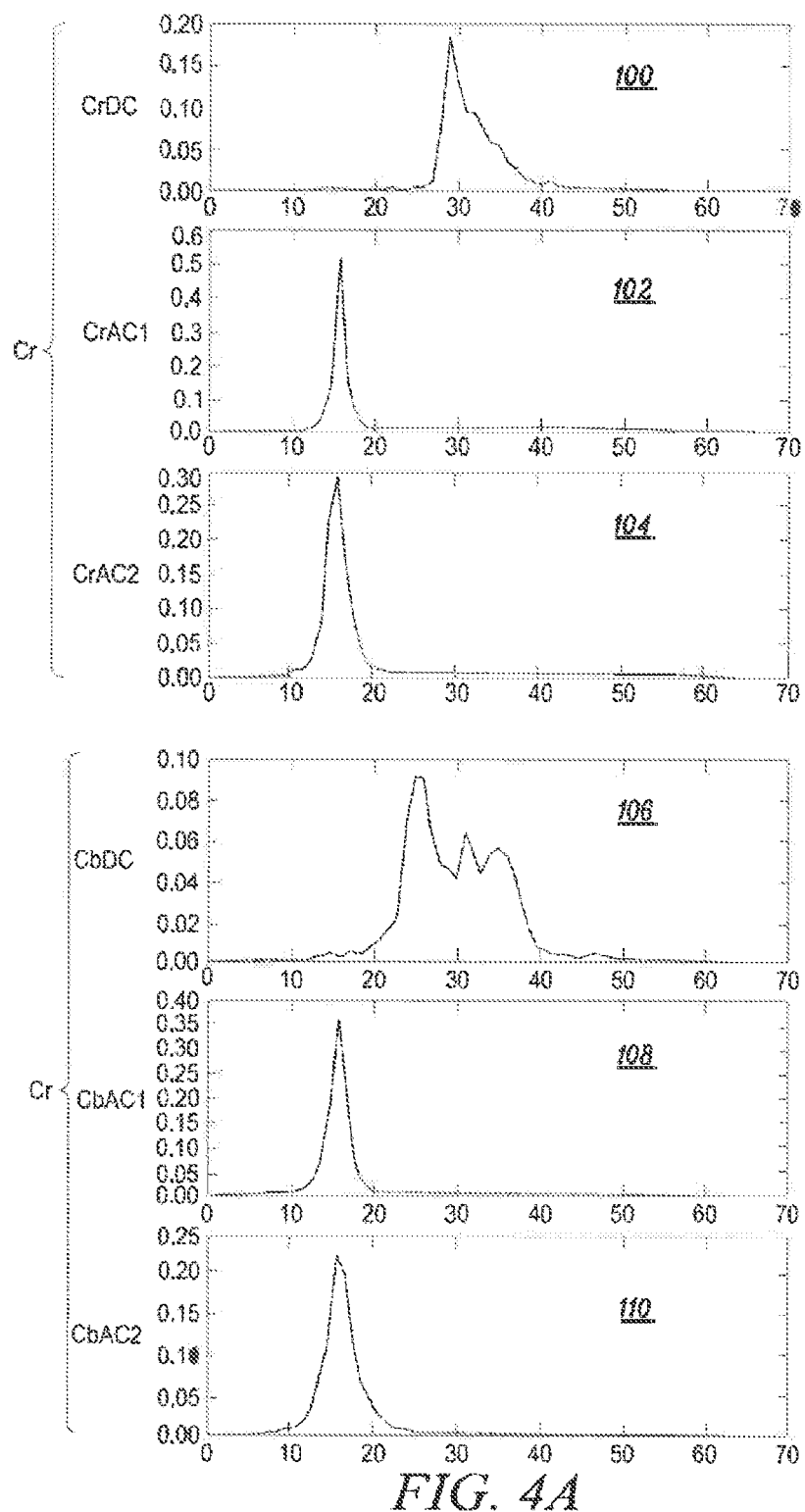
FIG. 4A and FIG. 4B are an example of a set of histograms generated for a frame of video in accordance with an embodiment.
Figure 4B:
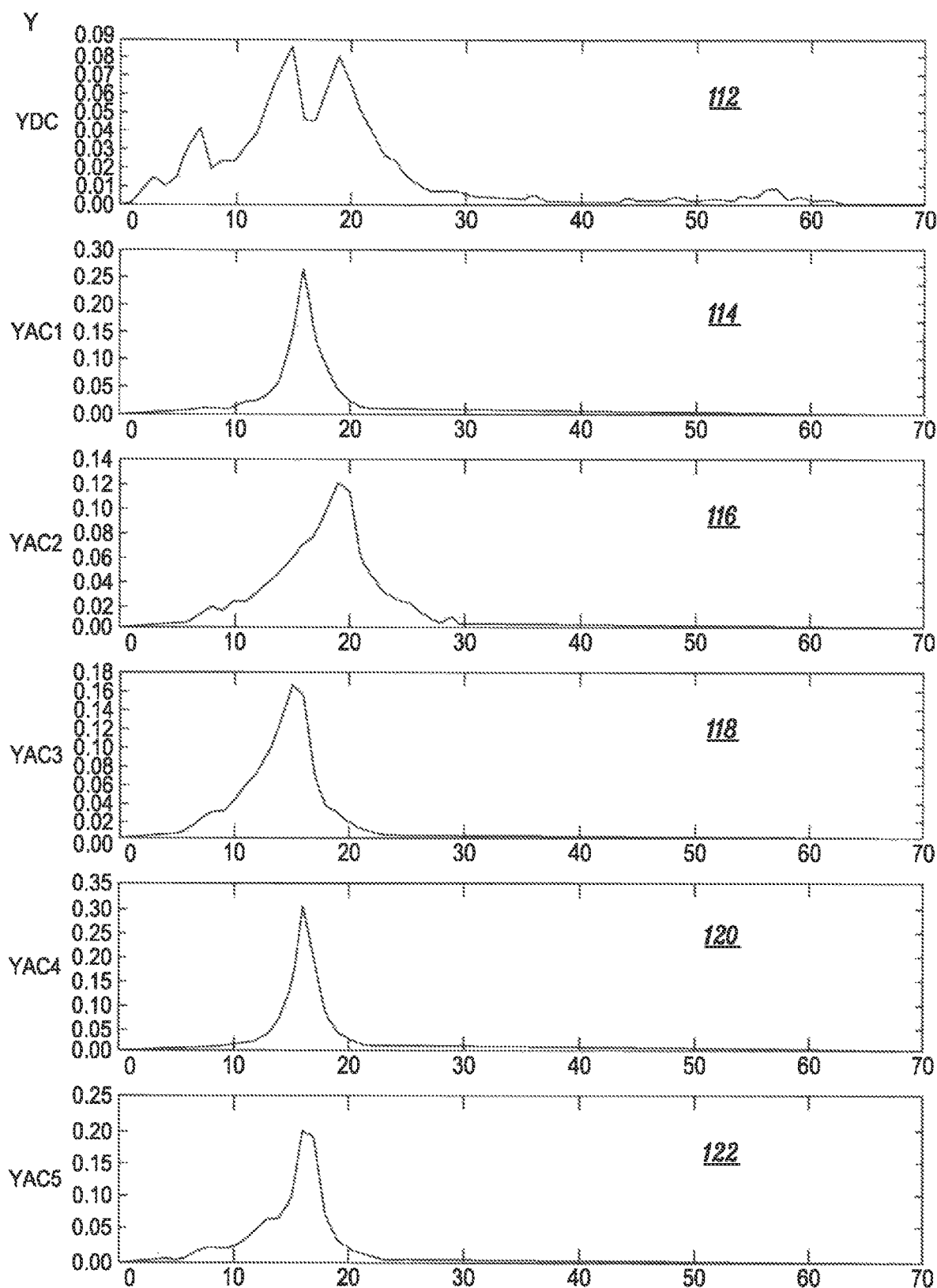

FIG. 4A and FIG. 4B together represent twelve histograms 100, 102, 104, 106, 108, 110 (depicted in FIG. 4A), and 112, 114, 116, 118, 120, and 122 (depicted in FIG. 4B) for the twelve coefficients of CLD generated for each of the 323,678 separate video frames of the test video. These provide a set of features for each frame. The Color Layout Descriptors (CLDs) capture spatial distribution of color in an image or frame of video, and the color histograms are representations of the distributions of colors in an image or frame of video or sequence of frames.

Figure 5:
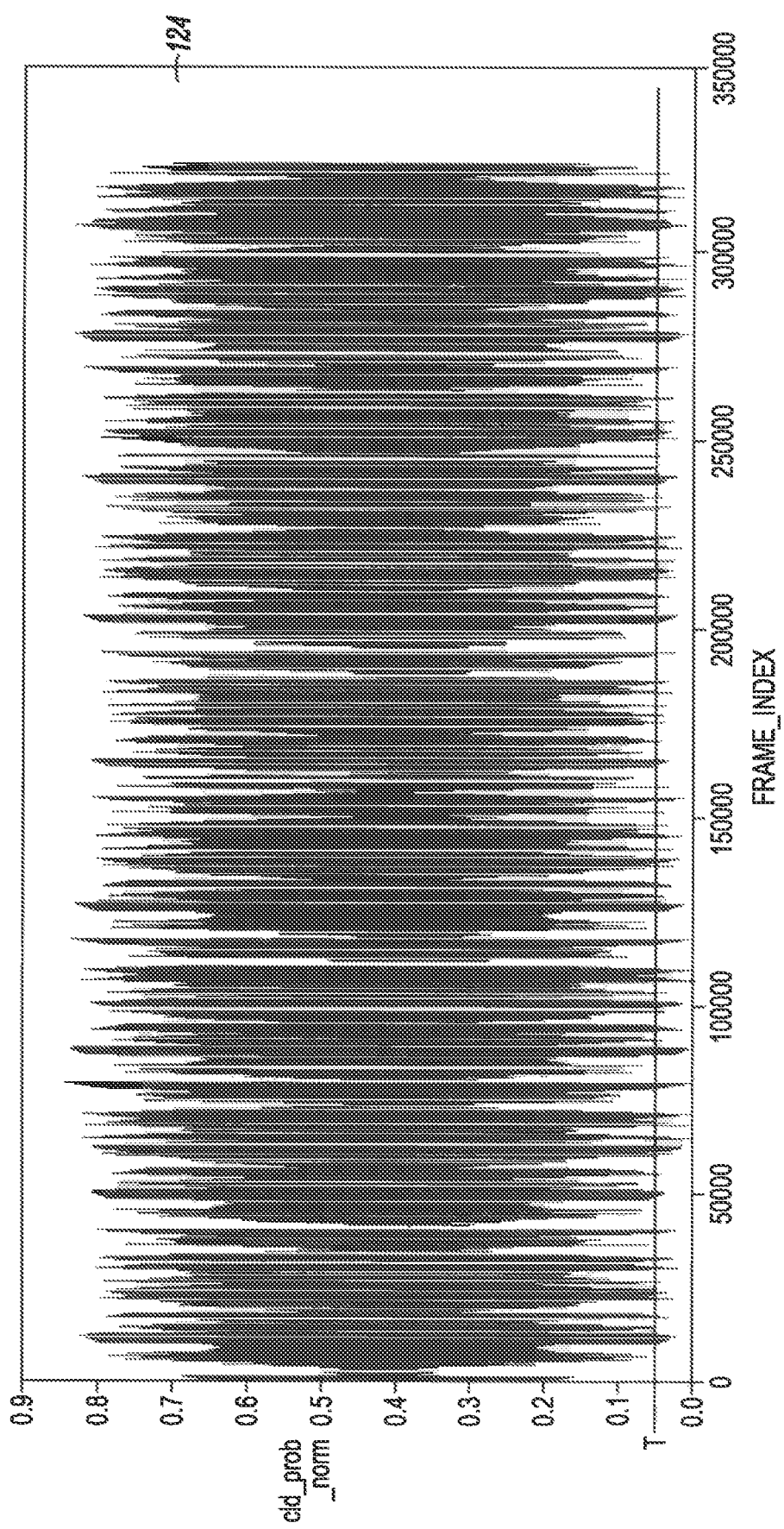
FIG. 5 is a probability distribution plot for frames within a video in accordance with an embodiment.
Figure 9:
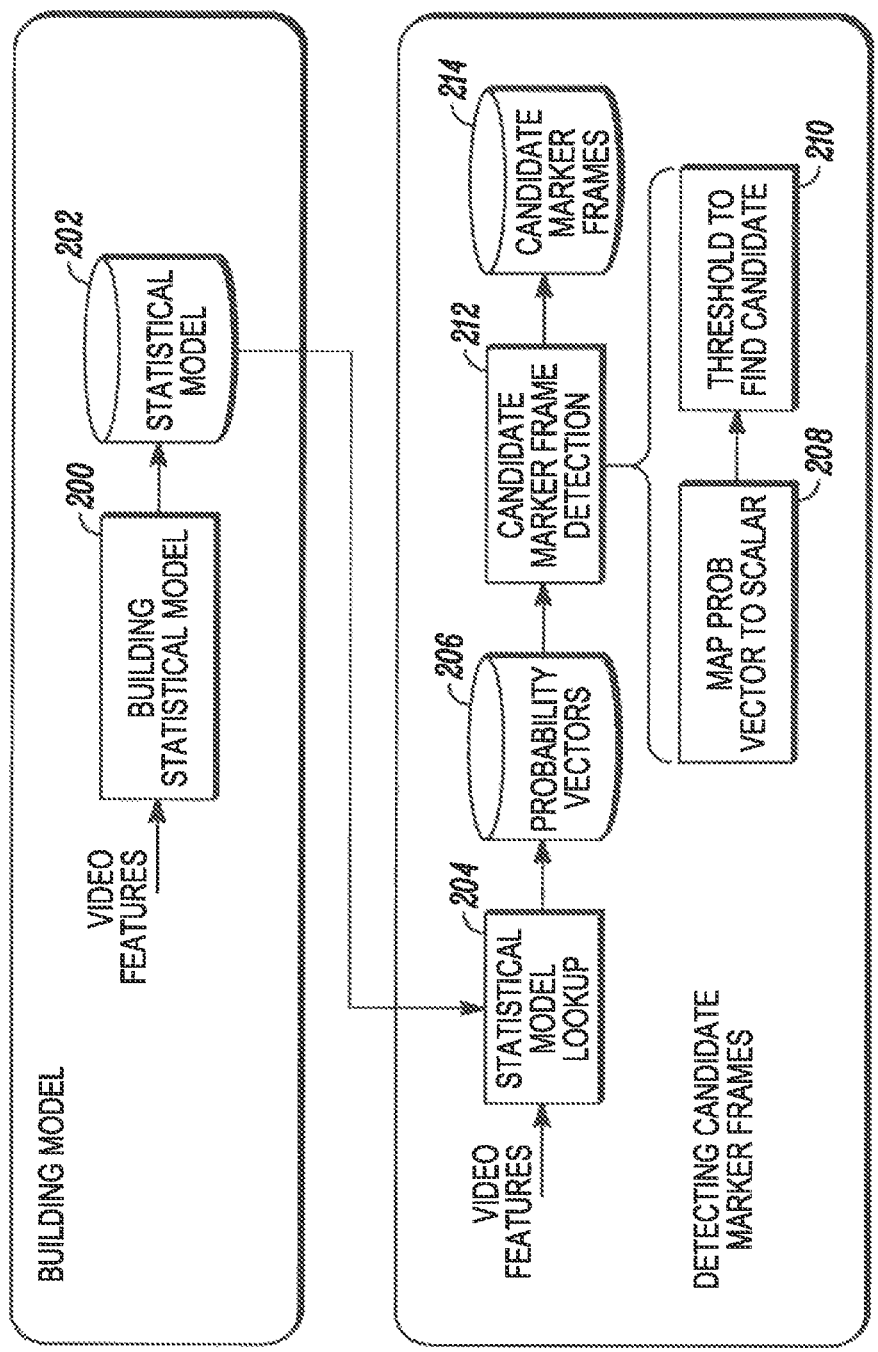
FIG. 9 is a flow diagram of a process for automatic detection of candidate marker frames in accordance with an embodiment.

As shown in FIG. 9, these video features (i.e., the CLD coefficients shown in FIG. 4A and FIG. 4B) are used in step 200 for building a statistical model 202 for the video, and the video features for each frame is then plugged into the statistical model in step 204 to generate a twelve-coefficient probability vector 206 for each frame. In step 208, the probability vector is mapped into a scalar, e.g. by Euclidean norm. For example, the plot 124 shown in FIG. 5 is the Euclidean norm of the probability vector for each frame of the test video. In step 210, the frames with norm value that are less than a threshold T (for instance, as shown in FIG. 5) are selected so that in step 212 the candidate marker frames 214 can be detected.

Figure 6:
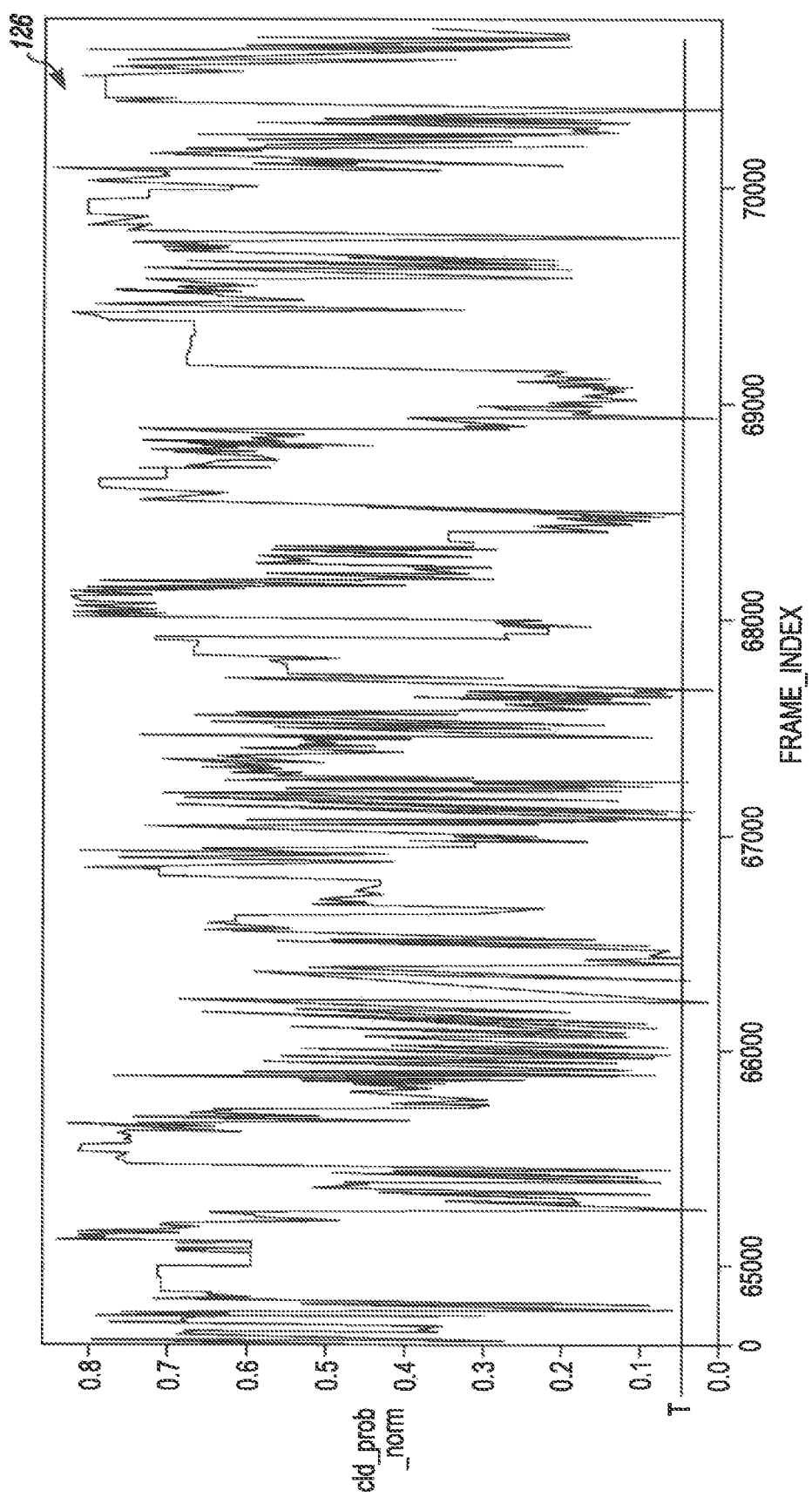
FIG. 6 is a magnified view of a portion of the probability distribution plot of FIG. 5 in accordance with an embodiment.

In FIG. 5, common video content of the test video is represented in the mid-level part of the plot 124 and frames which extend below T represent "rare" frames or frames which are distinctive from the common content. For the test video, 27,155 frames (or 8.3% of video frames) out of the total of 323,683 frames of the test video were selected as candidate marker frames by use of the plot 124 and threshold operation. FIG. 6 provides a magnified view of a section 126 of the plot 124. Here, the frames which extend below the threshold T can be readily identified.

Figure 7:
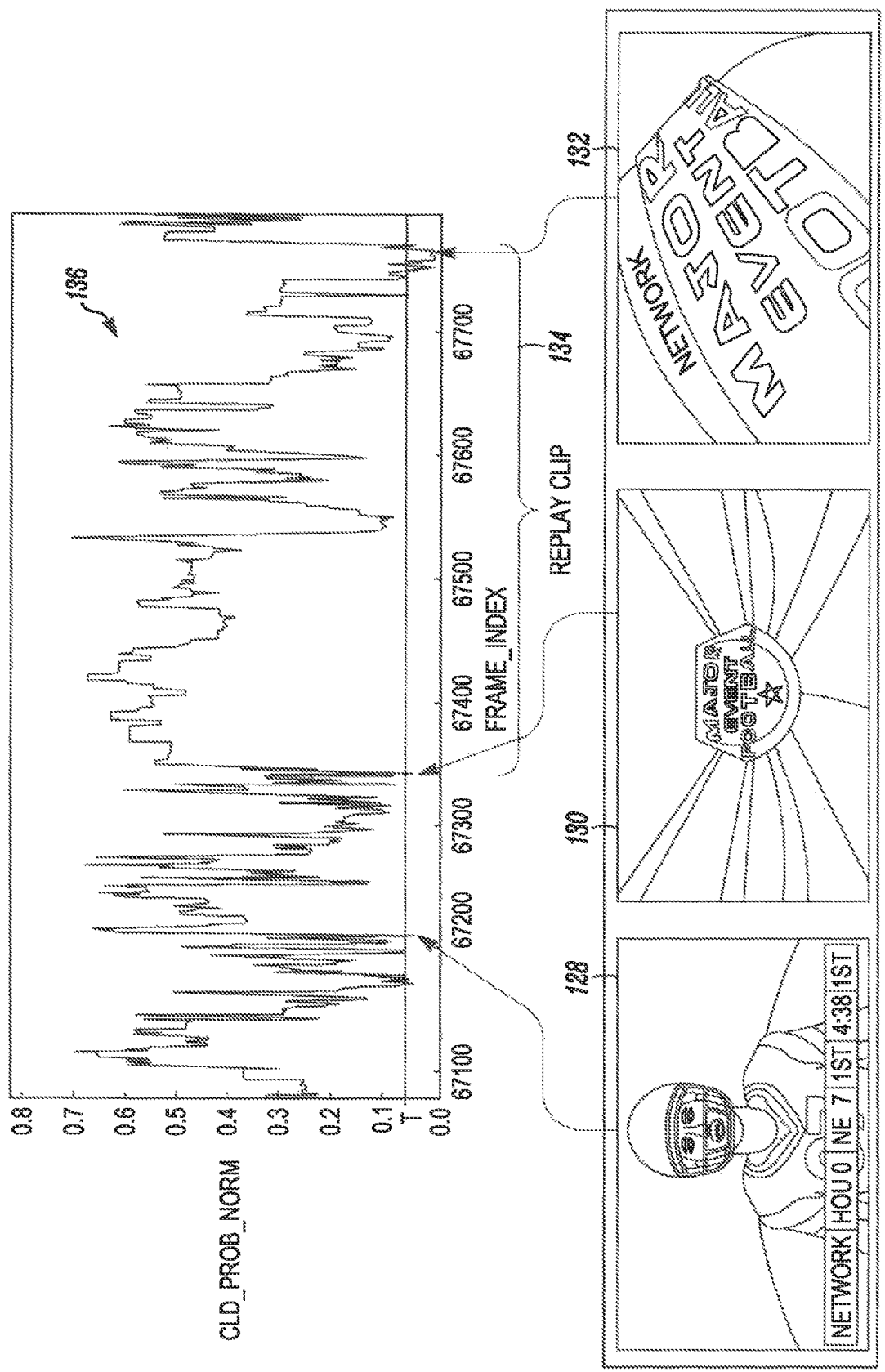
FIG. 7 is a diagram showing a step of selecting candidate marker frames from a probability distribution plot in accordance with an embodiment.

Each of the 27,155 candidate marker frames 214 identified in the test video was grouped with visually similar candidate marker frames that are temporally scattered throughout the test video. See step 216 in FIG. 10. One or more of the groups must be identified for the start/end of replay clips. Out of the 27,155 selected candidate marker frames in the test video, 10,322 hash entries (candidate marker groups) were generated based on visual similarity among the frames. Sample video frames for three of the 10,322 groups are shown at the bottom of FIG. 7 as groups 128, 130 and 132 of candidate marker frames.

Figure 10:
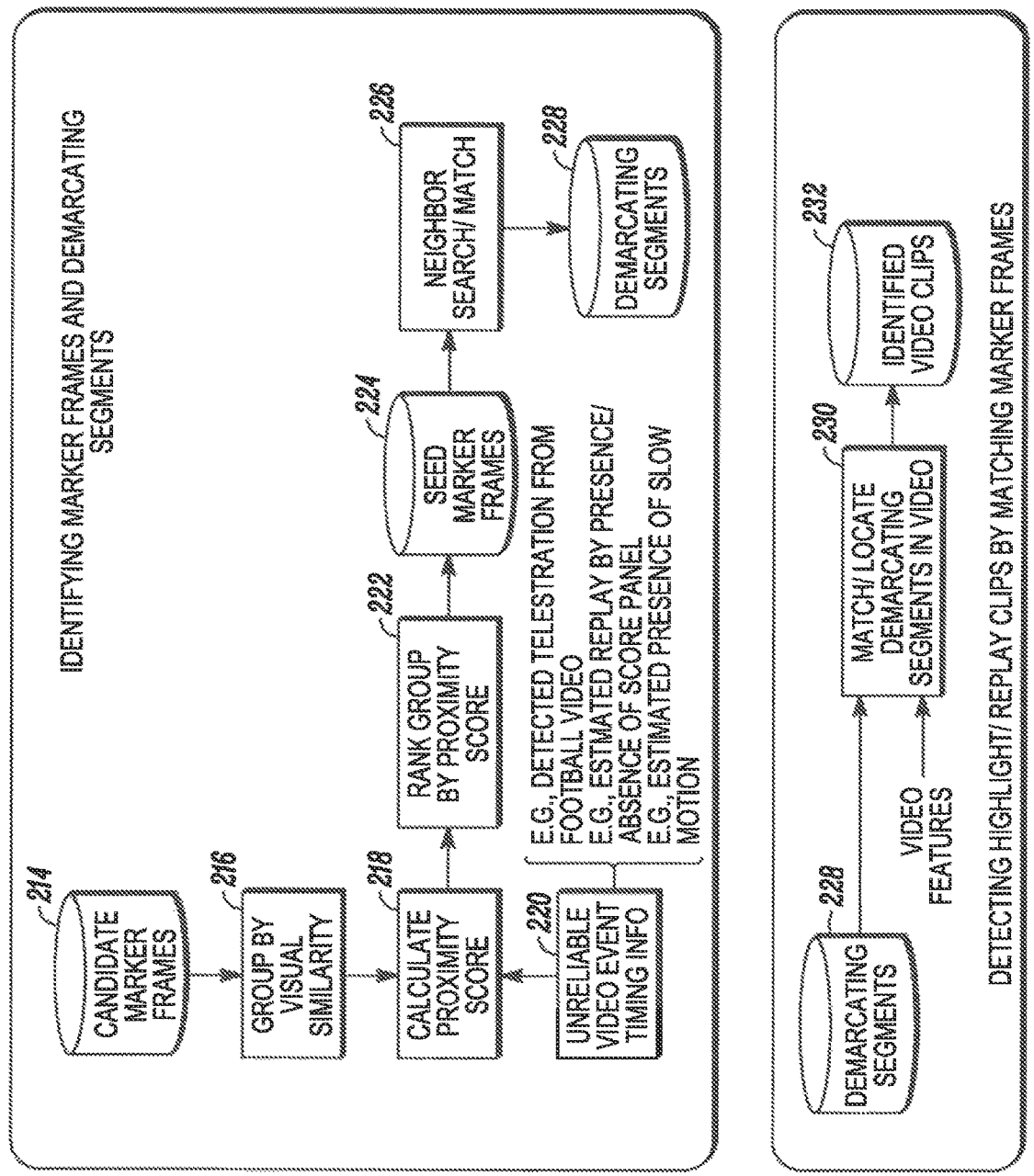
FIG. 10 is a flow diagram of a process for automatic identification of marker frames from candidate marker frames and for detecting highlight/replay clips in a video in accordance with an embodiment.

In step 218 of FIG. 10, the collective proximity score for each of the groups is calculated. Event input 220 is used for purposes of calculating the proximity score. In the test video, the event input 220 was telestration, and there was twenty-six separately detectable telestration events detected throughout the test video. One of the telestration events was used to detect the replay clip 134 shown below the probability distribution plot 136 in FIG. 7. Here, a frame corresponding to the group 128 shown in FIG. 7 is spaced furthest from the replay clip 134 and clearly will be given the lowest proximity score for the replay clip 134. In contrast, a frame corresponding to the group 130 has the highest proximity score relative to the start of the replay clip 134, and a frame corresponding to the group 132 has the highest proximity score relative to the end of the replay clip 134.

A score is calculated for each group for each of the replay clips detected as having telestration. The collective result is determined for each group and thereafter, each group is ranked by proximity score in step 222 of FIG. 10.

Figure 8:
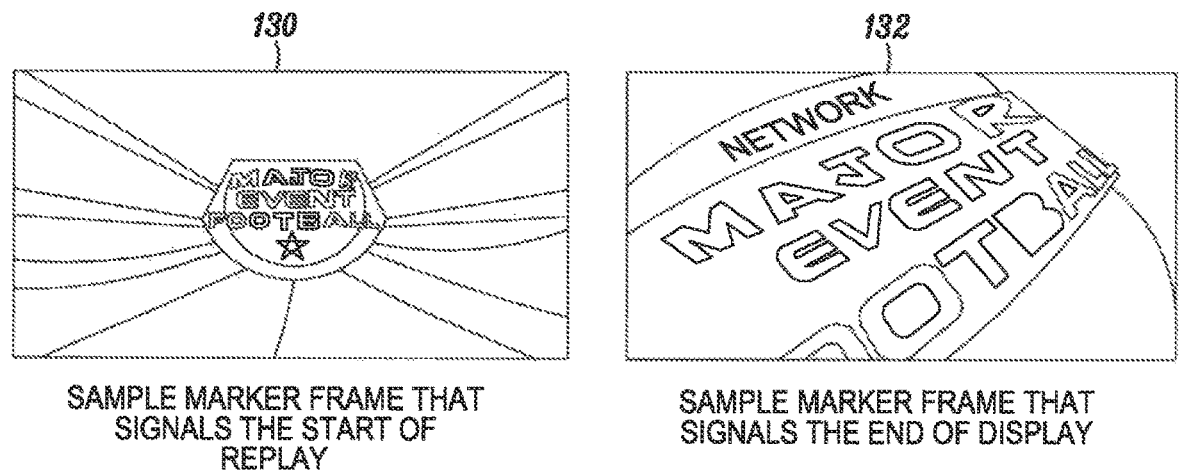
FIG. 8 is a diagram showing the frames of the video automatically detected as being marker frames in accordance with an embodiment.

Thus, the collective result is used to identify the most likely groups indicating the seed marker frames 224 of the start and end of each replay from the 10,322 candidate marker groups. As shown in FIG. 8, the group 130 of candidate marker frames was selected as the true replay start marker frame and the group 132 of candidate marker frames was selected as the true replay ending marker frame for the test video. With these marker frames, seventy-six separate replay clips were detected and located within the three hour test video.

As shown in FIG. 10, the video is searched for frames matching the seed marker frames 224 in step 226 for use in determining the demarcating segments 228 which may include a sequence of video frames adjacent the seed marker frames that are repeated throughout the video with the seed marker frames 224. Thereafter, segments occurring within the video that match the signature or video features of the demarcating segments 228 are located within the video in step 230 and are used to identify the desired video clips 232 in the video (i.e., replay clips in the example). For instance, the average CLD coefficients of selected marker frames can be used as signatures for identifying the start and end of replay clips occurring throughout the three hour test video. In one embodiment, identifying the desired video clips 232 can comprise storing the time of occurrence of demarcating segments 228 within the video. The time of occurrence may be represented, for example, as the time in hours, minutes, seconds, and fractional seconds from the beginning of the video to the occurrence of the demarcating segment. In another example, the time of occurrence may be represented as the count of video frames from the beginning of the video to the occurrence of the demarcating segment. Identifying the desired video clips may further comprise storing the times of occurrence in a data store for later retrieval. In some embodiments, the time of occurrence may be stored with an indication of whether the demarcating segment signified the start of a replay or the end of a replay.

The above example demonstrates that the two step process including use of input events, such as telestration, to qualify marker frames and then use of qualified marker frames to detect replay clips, provides better results than the mere direct use of input events, such as telestration, to search for replay clips in the test video.

Figure 11:
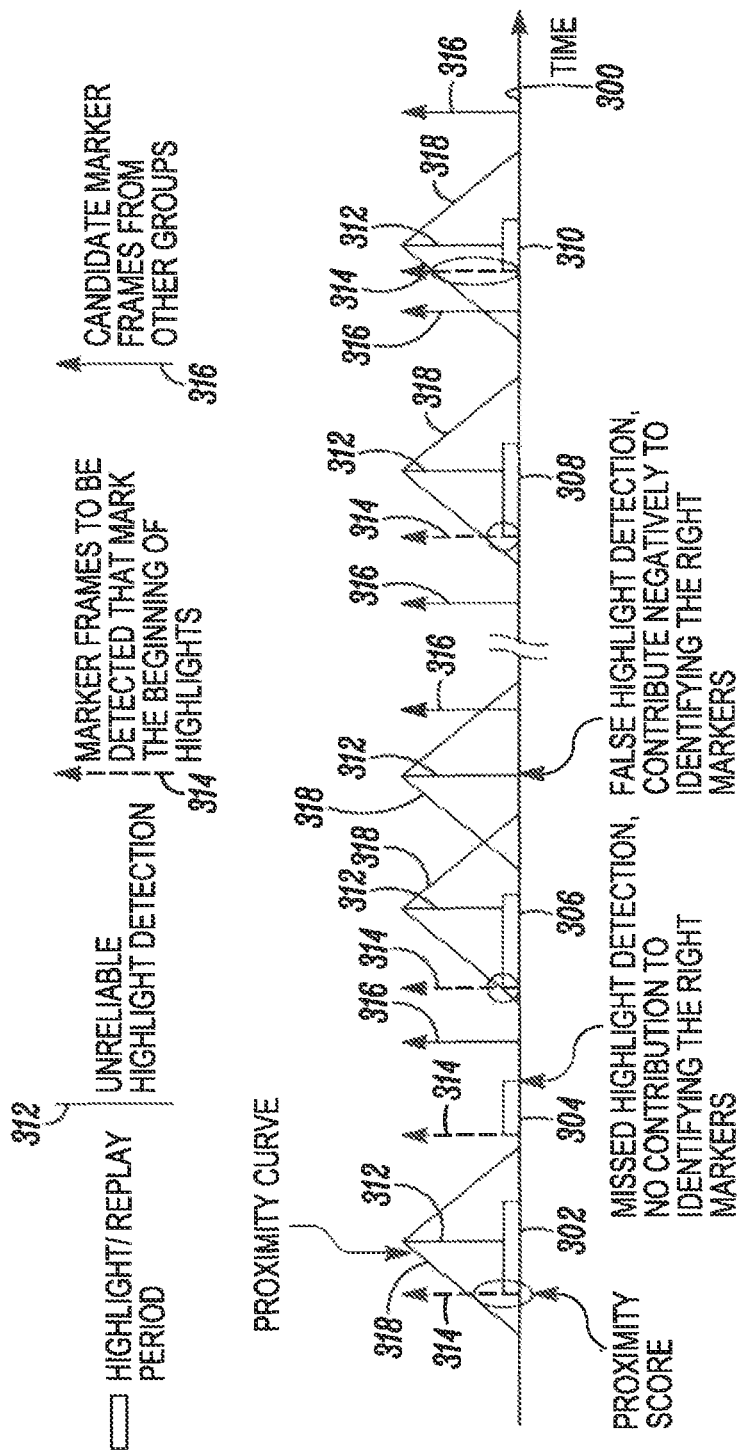
FIG. 11 is a diagram comparing temporal proximity of candidate marker frames relative to highlight/replay clips within a video in accordance with an embodiment.

FIG. 11 demonstrates the effectiveness of proximity scoring as discussed above. In the video time line 300 in FIG. 11, replay clips 302, 304, 306, 308 and 310 are shown. A telestration event 312 is detected in each of replay clips 302, 306, 308 and 310, but not in replay clip 304. In addition, a false telestration event 312 that does not occur during a replay clip is shown as occurring between replay clips 306 and 308. Marker frames 314 demarcate the beginning of each replay clip and candidate marker frames 316 represent visually distinct frames that are unrelated to demarcating replay clips.

In FIG. 11, a proximity score curve 318 is located adjacent each telestration event 312. The closer the marker frame 314 or other candidate marker frames 316 are to a telestration event 312, the higher the proximity score for the frame. For example, with respect to replay clips 302, 304, 306 and 308, the adjacent marker frames 314 each obtain a proximity score as shown as circled extending toward a proximity curve 318. However, the marker frame 314 adjacent to replay clip 304 does not obtain a score (i.e., score=0) because replay clip 304 does not include a telestration event 312. Likewise, the candidate marker frame 316 that is located between clips 304 and 306, the second of the two candidate marker frames 316 located between clips 306 and 308, and the candidate marker frame 316 located after clip 310 fail to obtain a score (i.e., score=0).

Although not a seed marker frame, the first of the candidate marker frames 316 between replay clips 306 and 308 obtains a score based on its proximity to the false occurrence of a telestration event 312, and the candidate marker frame 316 occurring shortly before replay clip 310 obtains a score due to its close proximity to replay clip 310. However, based on the use of collective scoring within the group and not individual frame score, the collective proximity score of the group of candidate marker frames 316 will be less than that of the group of true marker frames 314. This is true despite telestration events not being present in each replay clip and despite telestration events occurring outside of replay clips. Provided the majority of true marker frames are adjacent to replay clips having telestration events, the true group of marker frames will be selected over other groups of candidate marker frames.

While the above examples primarily focus on automatic detection of replay clips in broadcast videos of football games, this is only provided by way of example and replays in any type of sports broadcast or any type of desired video segment that is demarcated in some manner within a video of any type of subject matter that is not limited to broadcast sports games, can be automatically detected.

Further, a video processing electronic device configured to automatically detect frames in a video that demarcate a pre-determined type of video segment within the video is also contemplated. For instance, such a device may include at least one processing unit configured to identify candidate marker frames within a video as discussed above, group the candidate marker frames into a plurality of groups based on visual similarity as discussed above, compute a score for each of the groups based on temporal proximity of each of the candidate marker frames within the group to a detected event in the pre-determined type of video segment within the video as discussed above, and select at least one of the groups based on the score as marker frames that demarcate the pre-determined type of video segment. Such a device may also be configured to automatically locate the pre-determined type of video segments within the video by detecting the marker frames in the video and generate a highlight video containing only the pre-determined video segments.

The above referenced device and processing unit may include various processors, microprocessors, controllers, chips, disk drives, and like electronic components, modules, equipment, resources, servers, and the like for carrying out the above methods and may physically be provided on a circuit board or within another electronic device. It will be apparent to one of ordinary skill in the art that the processors, controllers, modules, and other components may be implemented as electronic components, software, hardware or a combination of hardware and software.

For example, at least one non-transitory computer readable storage medium having computer program instructions stored thereon that, when executed by at least one processor, cause the at least one processor to automatically detect frames in a video that demarcate a pre-determined type of video segment within the video is contemplated by the above described embodiments.

In the foregoing specification, specific embodiments have been described. However, one of ordinary skill in the art appreciates that various modifications and changes can be made without departing from the scope of the embodiments as set forth in the claims below. Accordingly, the specification and figures are to be regarded in an illustrative rather than a restrictive sense, and all such modifications are intended to be included within the scope of the embodiments.

We claim:

1. A method of detecting frames in a video that demarcate a pre-determined type of video segment within the video, the method comprising the steps of:
   identifying candidate marker frames within the video, each of the candidate marker frames having a visual feature set, wherein each of the candidate marker frames is visually distinctive based on a dissimilarity of the visual feature set to a statistical model of the video;

grouping the candidate marker frames into a plurality of groups based on visual similarity to one another;

computing a collective score for each of the groups based on temporal proximity of each of the candidate marker frames in each of the groups to related events within the video; and selecting at least one of the groups based on the collective scores of marker frames that demarcate the pre-determined type of video segment.

2. A method according to claim 1, further comprising the step of locating the pre-determined type of video segments within the video by detecting location of marker frames in the video.

3. A method according to claim 2, further comprising the step of creating non-linear video content including the pre-determined type of video segments.

4. A method according to claim 1, wherein said related events within the video are detected events within the video.

5. A method according to claim 4, wherein said detected events are selected from a group consisting of slow motion, telestration, and absence of score panel, and wherein said selecting step includes determining the group of candidate markers having a collective score indicating the closest temporal proximity to the detected events.

6. A method according to claim 1, wherein said related events within thevideo are candidate marker frames from a second group of candidate marker frames, and wherein each of the candidate marker frames from the second group of candidate marker frames demarcates the end of a pre-determined type of videosegment within the video.

7. A method according to claim 1, wherein said identifying step includes a step of separately evaluating each frame of the video.

8. A method according to claim 1, wherein said evaluating step includes transforming each frame of the video into a set of visual features.

9. A method according to claim 8, wherein the set of visual features includes at least one of a Color Layout Descriptor (CLD), a color histogram, and an Edge HistogramDescriptor (EHD).

10. A method according to claim 8, wherein said identifying step includes a generating a probability distribution for the set of visual features.

11. A method according to claim 10, wherein said identifying step includes classifying frames of the video as being a visually distinctive candidate marker frame based on crossing a threshold defined within the probability distribution.

12. A method according to claim 1, wherein said grouping step includes a step of determining visual similarity between candidate marker frames so that visually similar candidate marker frames are placed in the same group.

13. A method according to claim 12, wherein said grouping step includes hashing.

14. A method according to claim 1, wherein the marker frames demarcate at least one of the beginning and end of the pre-determined type of video segment.

15. A method according to claim 1, wherein the pre-determined type of video segment includes replay video segments.

16. A method according to claim 1, further comprising the step of searching and matching for the marker frames and neighbor frames surrounding the marker frames at different locations within the video.

17. A video processing electronic device for detecting frames in a video that demarcate a pre-determined type of video segment within the video, comprising at least one processing unit configured to:

identify visually distinctive candidate marker frames within the video;

group the candidate marker frames into a plurality of groups based on visual similarity;

compute a score for each of the groups based on temporal proximity of each of the candidate marker frames within the group to related events in the pre-determined type of video segment within the video; and select at least one of the groups based on the score as marker frames that demarcate the pre-determined type of video segment.

18. A video processing electronic device according to claim 17, wherein said at least on processing unit is configured to automatically locate the pre-determined type of video segments within the video by detecting the marker frames in the video and to create video content including the pre-determined video segments.

* * * * *